Nov. 21, 1939.     F. E. FREY     2,180,672
PROCESS FOR CONVERTING GASEOUS HYDROCARBONS
Original Filed May 16, 1936
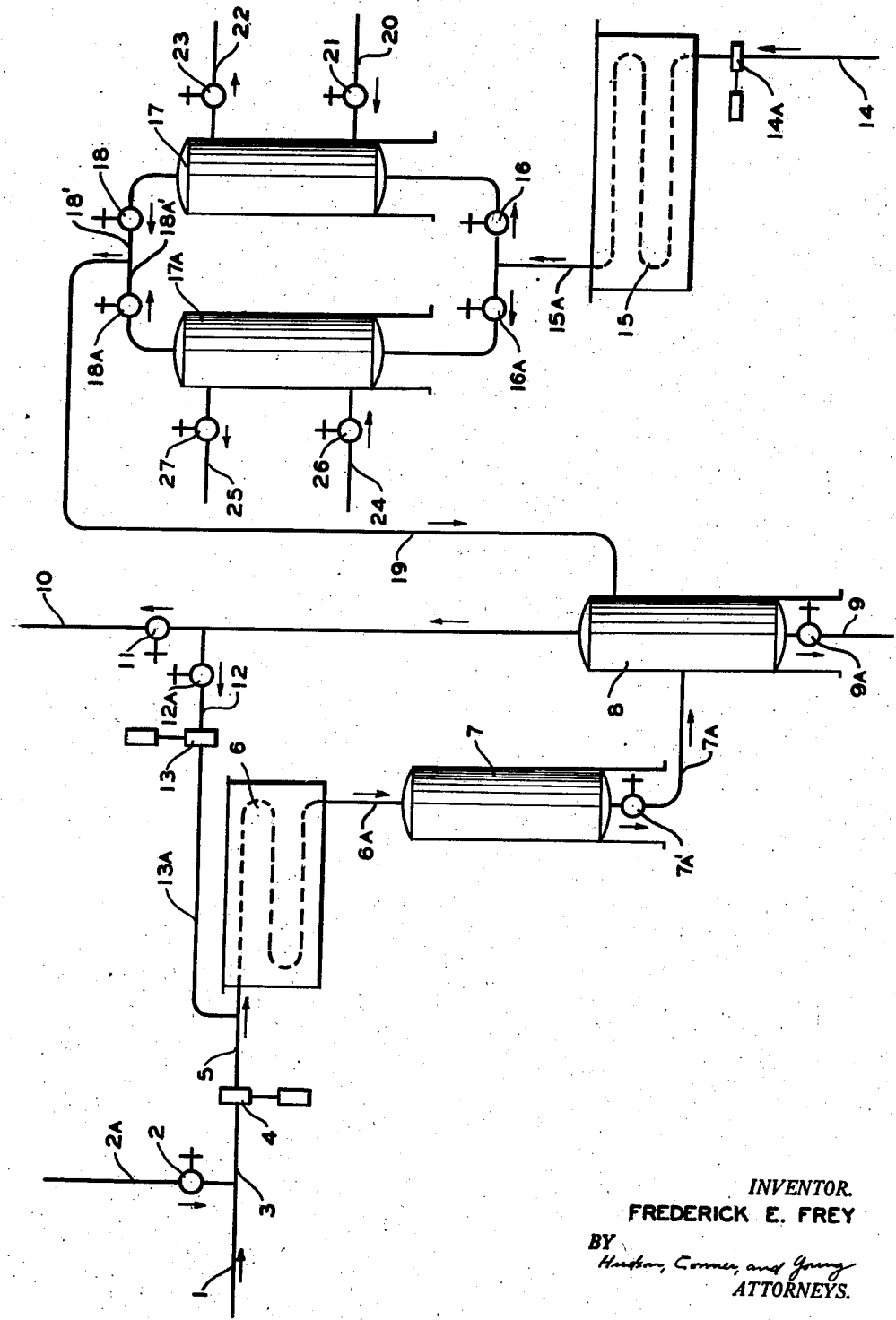
INVENTOR.
FREDERICK E. FREY
BY
Hudson, Conner, and Young
ATTORNEYS.

Patented Nov. 21, 1939

2,180,672

UNITED STATES PATENT OFFICE 2,180,672

PROCESS FOR CONVERTING GASEOUS HYDROCARBONS

Frederick E. Frey, Bartlesville, Okla., assignor to Phillips Petroleum Company, a corporation of Delaware Application May 16, 1936, Serial No. 80,160
Renewed January 26, 1939

12 Claims. (Cl. 196—10)

This invention relates to processes for the conversion of normally gaseous hydrocarbons into organic products of higher molecular weight and more specifically to the conversion of methane and higher gaseous hydrocarbons together with oxides of carbon into such organic products with the aid of solid catalytic agents.

The conversion of normally gaseous hydrocarbons into motor fuel by pyrolytic means is well known and may be effected at low or high pressures with the formation of normally liquid hydrocarbons of aromatic type when low pressures are employed and of less aromatic type at high pressures. Normally liquid products which may be hydrocarbons containing more or less of oxygenated molecules have been produced by subjecting a mixture of hydrogen with oxides of carbon to the action of a suitable catalyst whereby reduction of the oxides of carbon is effected and such products obtained.

An object of the present invention is the production of hydrocarbons suitable for motor fuel or for economical conversion into motor fuel from gaseous hydrocarbons of lower molecular weight by reacting them in the presence of catalyst with oxides of carbon, whereby such products are obtained, together with water, both hydrocarbons and oxides of carbon being consumed in the reaction.

Another object is the avoidance of the step of converting carbonaceous materials into hydrogen and carbon oxides for conversion into normally liquid products.

A further object is to avoid a reaction of highly exothermic character, which is encountered in the direct reduction of carbon oxides by hydrogen, with consequent difficulty in conducting the reaction under good control.

The catalysts to be employed in the process comprise one or more metals of the iron group, preferably nickel, cobalt, or iron, in intimate admixture with a difficultly reducible oxide of the group alumina, thoria, zirconia, chromium oxide. Catalysts of this type are known to produce liquid hydrocarbons by effecting interaction of hydrogen with carbon oxides, and familiar catalysts effective for this reaction are suitable for my process. The activity of the catalyst is improved by the presence of metallic copper or manganese oxide which may be incorporated in the form of the oxide, the constituents of the catalyst being in a state of intimate admixture such as results from precipitating together the metals as hydroxides from an aqueous solution of their salts. The dried precipitate so obtained is preferably reduced in a stream of hydrogen at 250° to 400° C. to activate it for use in reacting hydrocarbons with oxides of carbon.

The process according to this invention may be carried out at atmospheric pressure but conversion is slow and limited and a more rapid conversion is obtained at superatmospheric pressures which may be as high as 500 pounds per square inch or even more.

Gaseous hydrocarbons may be obtained admixed with oxides of carbon either by oxidizing a part of the hydrocarbon by means of a readily reducible metallic oxide such as copper oxide whereby carbon oxides are formed, or by combustion with a deficient volume of air.

By passing at least a part of the hydrocarbon gas over a readily reducible oxide, such as copper oxide, carbon dioxide may conveniently be incorporated in a hydrocarbon gas to produce a mixture suitable for reaction without the presence of inert combustion products, and with a saving in compression expense, in cases wherein the hydrocarbon gases are available at a more or less elevated pressure. In such use, copper is subjected from time to time to oxidation by oxygen-containing gas at 200° C. or higher to convert it to copper oxide after which the stream of oxidizing gas is interrupted and hydrocarbon passed through at a temperature of 250° to 450° C. sufficient to effect reduction of the oxide and conversion of hydrocarbon into oxides of carbon and water. Water thus formed may be advantageously extracted from the gas prior to their passage over the catalyst to produce oils.

Combustion products, producer gas, carbon dioxide, monoxide, or their mixtures from extraneous sources may be mixed directly with the gaseous hydrocarbons. The hydrocarbons containing oxides of carbon are then passed into contact with the catalyst in a finely divided form and at a temperature of between 150° and 350° C. within which range reaction takes place. The most favorable reaction temperature varies somewhat with the composition of the gases and the pressure, but can be readily determined by experiment.

It is desirable in order to conserve the activity of the catalyst to have present in the hydrocarbon-carbon oxide mixture to be converted in the process a very small percentage of added hydrogen, which should best be below 5 mol per cent; higher percentages of hydrogen discourage the conversion of hydrocarbon gases into higher boiling compounds. The proportion of oxides of carbon may vary within wide limits but will constitute less than 50 mol per cent of the gases entering the catalyst, the concentration of carbon oxides being preferably low with high operating pressure. At least one molecule of carbon dioxide or monoxide will be consumed per 4 molecules of hydrocarbon reacting under the conditions above set forth. Water is formed in the reaction and tends to inhibit the action of the catalyst. The gases accordingly may best remain in contact with the catalyst for a time only sufficient to convert not more than 30 per cent of the gaseous hydrocarbons present after which water should be removed, together with oils formed and the unconverted gaseous hydrocarbons and oxides of carbon may be brought once more into contact with another body of catalyst or returned to the same body of catalyst. In this way the gaseous reactants are subjected a plurality of times to the action of the catalyst.

For conversion in the process hydrocarbon gases predominating in methane are suitable, methane entering into reaction to yield a product of higher molecular weight predominating in hydrocarbons. The higher gaseous paraffins as well as olefins are suitable for the conversion and may be converted in admixture with methane, which in this case will also take part in the reaction. Catalysts suitable for the reaction are sensitive to poisoning by sulfur compounds which should accordingly be rather completely removed from the gases.

The figure represents diagrammatically one form of apparatus for effecting the process.

The operation of the process is shown in one embodiment in the figure. A hydrocarbon gas enters the system through conduit 1, oxides of carbon together with a small amount of hydrogen enter through valve 2 and conduit 2A and mingle with the hydrocarbon in conduit 3. The gases are then compressed by compressor 4, pass through conduit 5, are heated in heating element 6 to reaction temperature. The heated reactants then pass through a conduit 6A and through chamber 7 in which they come into contact with catalyst which effects a partial conversion into normally liquid products of the type of motor fuel, together with water. The reacted materials pass through conduit 7A and valve 7A' into separator 8 in which water and other products, mostly higher hydrocarbons, are separated from the gases and discharged through conduit 9 controlled by the valve 9A. The unreacted gases may be discharged through conduit 10 and valve 11, or may be returned through conduit 12, valve 12A, pump 13, and conduit 13A to the gases which will enter the reaction zone. The catalyst may be disposed within a reaction chamber as exemplified by chamber 7, or may be rotatably mounted in such a way that liquids formed on the surface are thrown off by centrifugal force resulting from rapid rotation of the catalyst bed. Increase in conversion rate is then obtained. Such an apparatus is described in my copending application filed September 17, 1934, Serial No. 744,431, for Process for converting hydrocarbons which is now Patent 2,079,935.

Oxides of carbon, predominantly carbon dioxide, may be supplied also by introducing hydrocarbon gases through conduit 14, compressor 14A, heating coil 15, conduit 15A, valve 16, and copper oxide chamber 17 wherein the oxides of carbon are produced by partial or complete oxidation of the hydrocarbon. The oxidized gases pass through valve 18, conduit 18' and conduit 19 to separator 8 wherein water is removed and the oxides of carbon enter the stream of recycled hydrocarbon gases passing through conduit 12 and pump 13 to the reactant gases entering the catalyst. Valve 2 in this case need pass only a sufficient volume of hydrogen, no more than 20 per cent by volume of the oxides of carbon supplied and reacted altogether, to sustain the activity of the catalyst. When the copper oxide in 17 is reduced, the flow from heating coil 15 may be changed to pass through valve 16A, chamber 17A and valve 18A, and conduit 18A', comprising an alternate copper oxide reacting system while the copper oxide in 17 is reformed by passing heated oxygen-containing gas in through pipe 20 controlled by valve 21 and out through pipe 22, controlled by valve 23. Pipes 24 and 25, and their respective valves 26 and 27 serve the same purpose in connection with chamber 17A.

As an example of the operation of the process, methane containing 5 per cent by volume of carbon dioxide and one per cent hydrogen is passed over a catalyst prepared by subjecting an intimate mixture of the oxides of nickel, copper and aluminum to the reducing action of hydrogen at between 250° to 400° C., at 200° C. and under 500 pounds per square inch pressure, to produce hydrocarbons of molecular weight higher than methane with consumption of methane and carbon dioxide. The higher boiling products together with water formed by reaction are separated by condensation from the reaction products.

I claim:
1. In a process for converting normally gaseous hydrocarbons into organic products of higher molecular weight predominantly hydrocarbons, passing normally gaseous hydrocarbons admixed with oxides of carbon into contact with a catalytic body containing a metal of the iron group in intimate admixture with a difficultly reducible oxide of the group alumina, thoria, zirconia, chromium oxide at a temperature between 150° and 350° C. whereby the hydrocarbons and oxides of carbon react to yield the said organic products, then separating from the catalytically treated gases the higher molecular weight organic products.

2. In a process for converting normally gaseous hydrocarbons into organic products of higher molecular weight, predominantly hydrocarbons, passing normally gaseous hydrocarbons admixed with an oxide of carbon and a proportion of hydrogen not exceeding 5 per cent into contact with a catalytic body containing a metal of the iron group together with a difficultly reducible oxide of the group aluminum, thorium, zirconium, chromium, at a temperature between 150° and 350° C. whereby the hydrocarbons and oxide of carbon react to yield the said organic products, separating the organic products and water formed by the reaction from the catalytically treated gases, and returning the unreacted hydrocarbons and oxide of carbon to contact with the catalytic body.

3. A process for converting normally gaseous hydrocarbons predominantly methane into higher molecular weight organic products predominantly hydrocarbons which comprises passing a predominantly methane hydrocarbon mixture admixed with an oxide of carbon and a proportion of hydrogen not exceeding 5 per cent into contact with a catalyst body comprised of a metal of the iron group in intimate admixture with a difficultly reducible oxide of the group alumina, thoria, zirconia, chromium oxide at a temperature between 150° and 350° C. under a superatmospheric pressure not greater than 500 pounds per square inch.

4. A process for converting methane into more valuable compounds containing two or more carbon atoms per molecule which comprises passing methane admixed with an oxide of carbon and not exceeding 5 per cent of hydrogen into contact with a catalytic body containing a metal of the iron group in intimate admixture with a difficultly reducible oxide of the group alumina, thoria, zirconia, chromium oxide at a temperature between 150° and 350° C. under a superatmospheric pressure.

5. A process for converting methane into more valuable compounds containing two or more carbon atoms per molecule which comprises passing methane admixed with an oxide of carbon and not exceeding 5 per cent of hydrogen into contact with a catalytic body containing a metal of the iron group in intimate admixture with a difficultly reducible oxide of the group alumina, thoria, zirconia, chromium oxide at a temperature between 150° and 350° C. under a superatmospheric pressure, separating a fraction containing organic products of two or more carbon atoms per molecule and water formed, separating a fraction free of water containing unreacted methane, admixed oxides of carbon and hydrogen and returning said fraction to be further treated.

6. A process for converting normally gaseous hydrocarbons, predominantly methane, into organic compounds of higher molecular weight and predominantly hydrocarbons, which comprises passing normally gaseous hydrocarbons admixed with between 5 and 50 mol per cent of carbon monoxide into contact with a catalytic body containing a metal of the iron group together with a difficultly reducible oxide of the group alumina, thoria, zirconia, chromium oxide, at a temperature between 150° and 350° C., whereby the hydrocarbons and carbon monoxide react to yield the said organic products, and separating said organic products from the treated gases.

7. A process for converting normally gaseous hydrocarbons, predominantly methane, into organic compounds of higher molecular weight and predominantly hydrocarbons, which comprises passing normally gaseous hydrocarbons admixed with between 5 and 50 mol per cent of carbon dioxide into contact with a catalytic body containing a metal of the iron group together with a difficultly reducible oxide of the group alumina, thoria, zirconia, chromium oxide, at a temperature between 150° and 350° C., whereby the hydrocarbons and carbon dioxide react to yield the said organic products, and separating said organic products from the treated gases.

8. A process for converting normally gaseous hydrocarbons into organic compounds of higher molecular weight and predominantly hydrocarbons which comprises passing normally gaseous hydrocarbons admixed with between 5 and 50 mol per cent of a carbon oxide into contact with a series of at least two catalytic bodies containing a metal of the iron group together with a difficultly reducible oxide of the group alumina, thoria, zirconia, chromium oxide, at a temperature between 150° and 350° C., and a superatmospheric pressure not in excess of about 500 pounds per square inch, whereby the hydrocarbons and carbon oxide react to yield the said organic products and water, removing water from the treated gases between successive catalytic bodies and finally separating said organic products from the treated gases after the last catalytic body.

9. A process for converting normally gaseous hydrocarbons into organic products of higher molecular weight predominantly hydrocarbons, which comprises passing normally gaseous hydrocarbons admixed with between 5 and 50 mol per cent of a carbon oxide into contact with a catalytic body containing nickel together with a difficultly reducible oxide of the group alumina, thoria, zirconia, chromium oxide at a temperature between 150° and 350° C. whereby the hydrocarbons and oxide of carbon react to yield the said organic products, and separating said organic products from the treated gases.

10. A process for converting normally gaseous hydrocarbons into organic products of higher molecular weight predominantly hydrocarbons, which comprises passing normally gaseous hydrocarbons admixed with an oxide of carbon into contact with a catalytic body containing cobalt in intimate admixture with chromium oxide at a temperature between 150° and 350° C. whereby the hydrocarbons and oxide of carbon react to yield the said organic products, and separating said organic products from the treated gases.

11. A process for converting normally gaseous hydrocarbons into organic products of higher molecular weight predominantly hydrocarbons, which comprises passing normally gaseous hydrocarbons admixed with between 5 and 50 mol per cent of a carbon oxide and a proportion of hydrogen not exceeding 5 mol per cent into contact with a catalytic body containing nickel and alumina at a temperature between 150° and 350° C. whereby reaction occurs to yield the said organic products, and separating said organic products from the treated gases.

12. A process for converting normally gaseous hydrocarbons into organic compounds of higher molecular weight, which comprises passing a normally gaseous mixture comprising normally gaseous hydrocarbons and between 5 and 50 mol per cent of a carbon oxide into contact with a series of at least two catalytic bodies containing a metal of the iron group, together with a difficultly reducible oxide of the group alumina, thoria, zirconia, chromium oxide, at a temperature between 150° and 350° C., and at a superatmospheric pressure to react hydrocarbons and carbon oxide yielding organic products of higher molecular weight and water, removing water from treated gases between successive catalytic bodies, and finally separating said organic products from the effluents of the last catalytic body.

FREDERICK E. FREY.